United States Patent [19]
Waltz

[11] 3,940,286
[45] Feb. 24, 1976

[54] DEEP SEA PRESSURE COMPENSATED EXPENDABLE ENERGY SOURCE

[75] Inventor: Allen R. Waltz, San Diego, Calif.

[73] Assignee: The United States of America as represented by the Secretary of the Navy, Washington, D.C.

[22] Filed: June 13, 1975

[21] Appl. No.: 586,849

[52] U.S. Cl............... 136/100 R; 136/113; 136/162
[51] Int. Cl.² ......................................... H01M 2/38
[58] Field of Search ........... 136/112, 113, 114, 162, 136/100 R, 100 M

[56] References Cited
UNITED STATES PATENTS

| | | | |
|---|---|---|---|
| 2,781,413 | 2/1957 | Luening | 136/162 |
| 3,394,034 | 7/1968 | Maes | 136/162 |
| 3,508,971 | 4/1970 | Colbeck et al. | 136/162 |
| 3,859,136 | 1/1975 | Perry et al. | 136/112 |

*Primary Examiner*—Donald L. Walton
*Attorney, Agent, or Firm*—Richard S. Sciascia; Ervin F. Johnston; William T. Skeer

[57] ABSTRACT

An improved power source for marine applications includes a salt water activated battery adapted for actuation after a specific predetermined immersion time. The improved battery construction is characterized by an enclosed volume of flexible, plastic material confining the seawater electrodes therein. The pair of panel-like closures seal apertures in the top and bottom surface of the battery case to confine an inert liquid filling therein. A retention mechanism holds the panel-like closures in the sealed position against the urging of an actuation system urging the panels in an open position.

10 Claims, 5 Drawing Figures

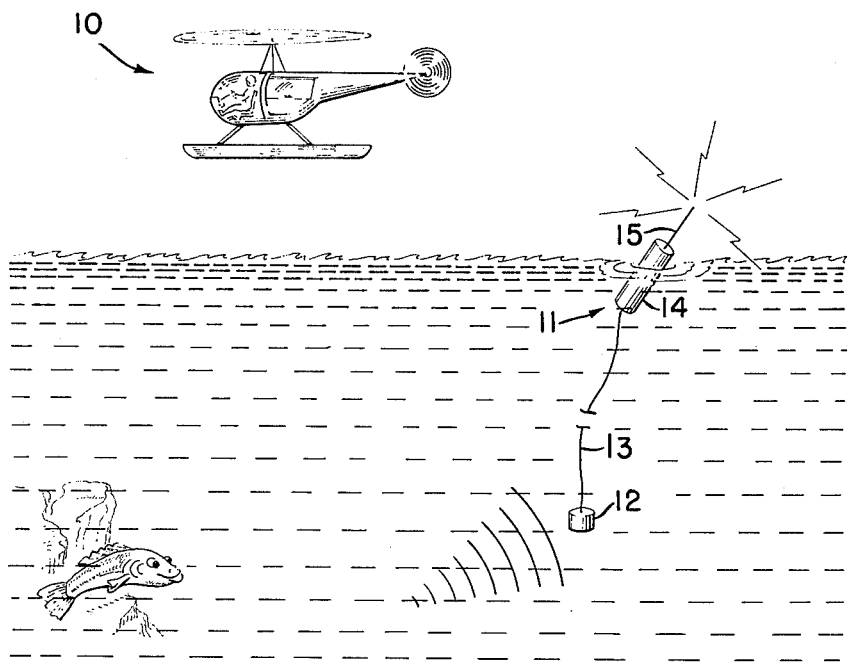
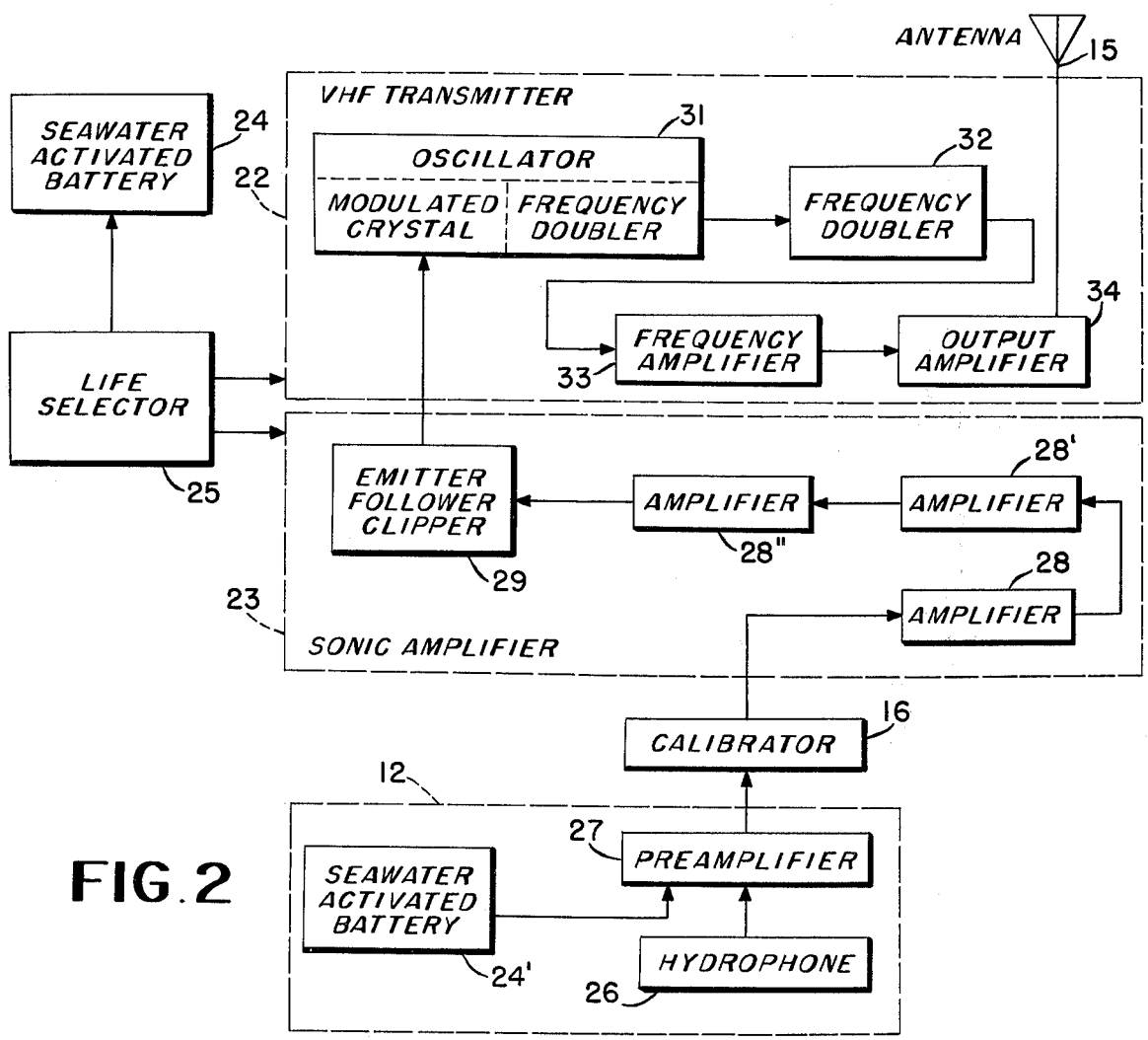
FIG.1
FIG.2

DEEP SEA PRESSURE COMPENSATED EXPENDABLE ENERGY SOURCE

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the fields of marine engineering and electronics. More particularly, this invention pertains to providing power sources for oceanographic instrumentation packages. In still greater particularity, this invention pertains to a seawater battery construction. In still greater particularity, this invention pertains to a seawater activated battery which may be submerged for a considerable length of time prior to activation. By way of further characterization and explanation, this invention pertains to a seawater activated battery which is activated by the opening of covered apertures therein such that the seawater environment may displace an inert fluid stored within the battery housing.

DESCRIPTION OF THE PRIOR ART

The traditional approach providing a pressure compensated energy source for deep sea applications is to use a lead-acid or a silver-zinc battery inside a box which is filled with oil, including the volume between the top of the box and the electrolyte level of the battery. The containing box is typically provided with a flexible panel which allows the enclosed volume to accommodate the differential compressibility of the seawater and the battery electrolyte and the compensating oil combination enclosed within the box. Although these batteries are excellent sources of energy for the environment for which they are intended to operate, they are too expensive to be considered expendable. The need for expendable batteries is particularly prevelent in air-drop oceanographic instrumentation buoys.

Further, these batteries require an auxiliary electrical control circuit to activate them which consumes additional power. Additionally, the lead-acid battery has a relatively low output capacity per unit of weight and the silver-zinc battery is quite expensive to manufacture because of the scarcity of the silver metal used in the electrodes.

Too, the storage or shelf life of the existing prior art batteries is limited and both types require periodic inspection and charging to remain useable.

SUMMARY OF THE INVENTION

The invention provides an improved deep ocean power source by using a battery employing seawater as the electrolyte and flexible walls which contain an inert substance during periods of shelf life. Upon immersion in the water, the pressure imposed by ambient seawater compresses the battery walls directly and although a small amount of the inert fluid may escape, the entrance of the electrolyte is postponed until the battery is activated. Activation is accomplished by uncovering apertures and the bottom and top of the battery and permitting the difference in the specific gravities of the inert filler and the seawater to displace the inert filler with the active electrolyte. In this fashion, a plurality of batteries may be electrically connected in parallel and sequentially activated such that a uniform source of power may be provided for prolonged periods keeping the expendable buoy operative in the on-station position for extended periods.

STATEMENT OF THE OBJECTS OF INVENTION

It is accordingly an object of this invention to provide an improved power source for oceanographic instrumentation purposes.

Yet another object of this invention is to provide an improved seawater battery.

It is still a further object of this invention to provide a seawater battery having selective activation after prolonged periods of immersion.

It is still a further object of this invention to provide an improved seawater battery which is low in cost and lending itself to expendable applications.

These and other objects of the invention will become more readily apparent from the ensuing specification taken together with the drawings.

BRIEF DESCRIPTION OF THE DRAWINGS

FIG. 1 is a perspective view showing the environmental applications employing the invention;

FIG. 2 is a diagrammatic representation of a circuit employing the improved power source of the invention;

DESCRIPTION OF THE PREFERRED EMBODIMENT

Figure 3:
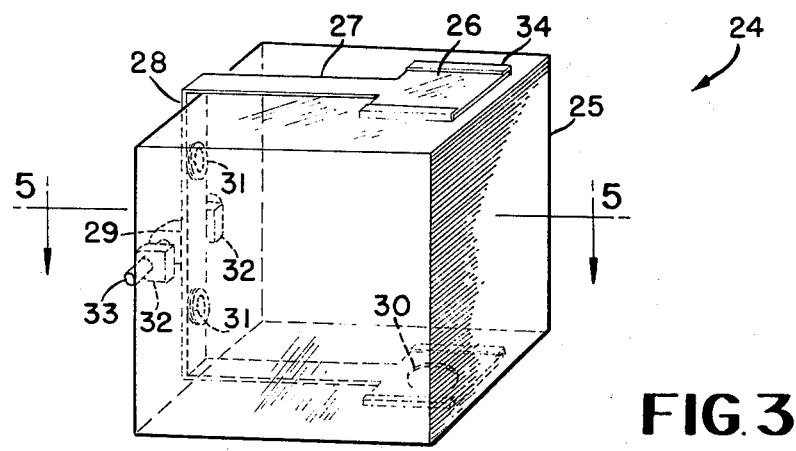
FIG. 3 is a perspective view of the battery according to the invention in the inoperative or storage condition.

FIG. 1 shows an aircraft 10 deploying a sonobuoy indicated generally at 11 in the ocean environment. As illustrated, oceanographic buoy 11 has a hydrophone instrument package 12 suspended at the distal end of a telemetry cable 13 extending downwardly from buoyant body portion 14. An antenna 15 atop buoyant body portion 14 extends upwardly therefrom into the air to facilitate electromagnetic communication with personnel or instruments within aircraft 10. Referring to FIG. 2, a diagrammatic view of an exemplary circuit arrangement for inclusion within the oceanographic buoy 11 is illustrated. As shown, a VHF transmitter 22 and a sonic amplifier 24 are powered by a seawater activated battery 24 which is controlled by a life selector circuit 25 which electrically reduces the power drain from seawater battery 24. The hydrophone package 12 also has a seawater activated battery 24 such that the power loss due to the length of telemetering cable 13 may be more readily compensated for. Seawater activated battery 24' may, for example, power a preamplifier 27 which electrically amplifies the signals from hydrophone 26 for transmission to sonic amplifier 23. As is conventional in the art, the output from preamplifier 27 is compared by a calibrator circuit 16 before passing to sonic amplifier 23. Sonic amplifier 23 includes three stages of amplification indicated at 28, 28', and 28" before going through signal processing circuits such as emitter follower clipper 29. The output from the sonic amplifier 23 is then used to modulate a crystal oscillator frequency doubler 31 which again, goes through frequency doubling by frequency doubler 23 to arrive at a suitable broadcast frequency for transmission to aircraft 10. The output from frequency doubler 32 is amplified by amplifiers 33 and 34 before being fed to antenna 15.

Thus, it may be seen that in the simplified application illustrated in FIGS. 1 and 2, the two sources of electrical energy, seawater battery 24 and 24' are required. In instances when oceanographic instrumentation cable 13 is of considerable length, for example on the order of 500 meters, a tremendous pressure variation exists between the operational conditions of seawater activated battery 24 and seawater activated battery 24'. In the past, such extreme pressure variations required separate design criteria for these two batteries. Therefore, it may be seen that the provision of a single seawater activated battery design to satisfy both of these requirements would result in a considerable cost savings and facilitate supply and procurement.

Referring to FIG. 3, the salient features of the invention may be more readily understood. The plurality of lateral walls 25 enclose the seawater electrodes which, for example, may be made of silver chloride-magnesium or cuprous chloride-magnesium.

It should be noted, that seawater electrolyte batteries are well known in the prior art and no specific electrode arrangement or composition is required for the understanding of this invention. For example, the electrode arrangement shown in U.S. Pat. No. 2,781,413 issued on Feb. 12, 1957 to J. W. Luening for "Deferred-Action Battery", or alternatively, that shown in U.S. Pat. No. 2,826,727 issued on Mar. 11, 1958 to G. T. Aldrich for "Deferred Action Battery" may be employed, if desired.

Top and bottom panels are positioned to intersect the lateral wall panels 25 and provide an enclosed volume for the electrodes structure and provide a fluid tight enclosure therewith. A plurality of apertures 30, two shown, may be placed in the top and bottom panels to permit the free circulation of fluid therethrough. A flat panel-like closure 26 cooperates with each of the apertures 30 to provide a fluid tight seal therefor. It will be observed that the same panel closure is used to cover apertures 30 in both the top and bottom panels of seawater battery 24. To provide timely opening of these apertures, panels 26 rotated on the top and bottom of the battery are adjoined by a suitable linkage means comprising arms 27 and a linking bridge 28.

Bridge 28 has an aperture 29 which extends in a substantially horizontal direction, as viewed in FIG. 3, to receive a retaining pin therein. As illustrated in FIG. 3, this retention pin 33 holds panels 26 in sealing engagement with apertures 30.

Figure 4:
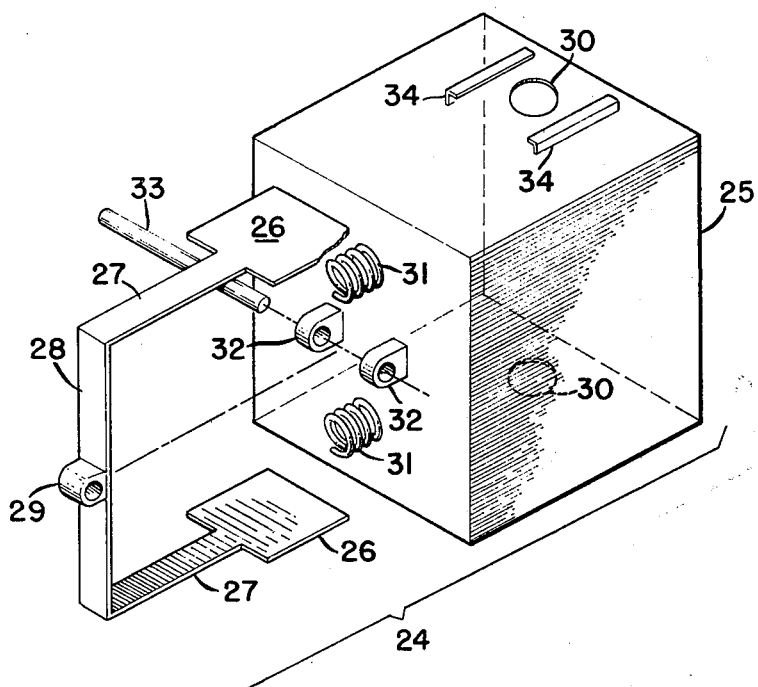
FIG. 4 is a perspective, exploded view of the seawater activated battery according to the invention showing the dovel components thereof.
Figure 5:
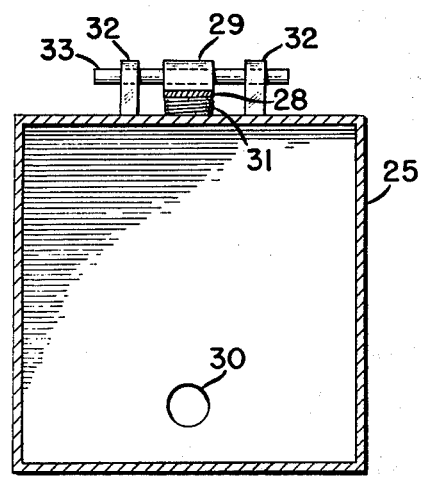
FIG. 5 is a sectional view of the seawater battery of the invention taken along lines 5—5 of FIG. 3.

Referring to FIG. 4, an exploded view of battery 24 shows panels 26 withdrawn from their operative or closing position and with battery 24 rotated 90° such that the linkage and retention means may be better seen. As shown, a plurality of upstanding bosses 32 have apertures extending therethrough to cooperate with aperture 29 when panels 26 are in their operative or closure position. Also shown, are a plurality of springs 31 which urge linking arm 28 to its withdrawn or illustrated position. When panels 26 are in their closed position springs 31 are compressed and retention pin 33 inserted through bosses 32 and aperture 39 to retain panels 26 in their sealing or closed position. Of course, springs 31 are but illustrative of any compressional means to urge linkage 28 to the withdrawing position and may, for example, comprise resilient rubber blocks or pneumatic actuators.

Pin 33 may be axially withdrawn in the same fashion that it is inserted, by timed actuation means, not shown, to release the linkage means and withdraw panels 26 to their inoperative position. Rather than employing a mechanical withdrawal of pin 33, pin 33 may be made of a water soluble material such that its rate of dissolving in the ambient water environment may be controlled in a well understood fashion to provide for movement of panels 26 after a predetermined time of immersion. Manufacture of such water soluble materials is a well understood branch of the marine engineering arts and it need not be described in greater detail herein for the complete understanding of the invention.

Referring to FIG. 4, the sectional view taken along lines 5—5 of FIG. 3 show the engagement of pin 33 through bosses 32 in aperture 29 and the compressed spring 31 in greater detail. As illustrated, a single aperture 30 is in each of the top and bottom panel means. Of course, if desired, other arrangements and numbers of apertures is possible and is known in the art as shown by U.S. Pat. No. 3,285,782 issued on Nov. 15, 1966 to W. N. Carson Jr. et al. for "Water Activated Primary Battery Having A Mercury-Magnesium Alloy Anode".

Closure panels 26 may be integrally formed with linkage 27 and 28 in such a fashion as to having natural resilient compression, one towards the other, to provide fluid tight engagement with the top and bottom panels of battery 24. However, it has been found that the fluid tight seal and actuation of closure panels 26 is improved if a plurality of guides 34 are placed on the top and bottom panels to engage the lateral portions of panels 26. Guides 34 may be formed integrally with the top and bottom panels or, alternatively, they may be affixed thereto by conventional fastening techniques. The size and dimensions of guides 34 likewise depend on common and well understood design parameters such as the thickness of panels 26 and the withdrawal force available by resilient means 31.

MODE OF OPERATION

The mode of operation of the invention is rather straightforward and substantially as discussed above. That is, battery 24 is manufactured with conventional seawater activated electrodes therein and immersed in an inactive fluid such as alcohol or other insulating liquids. Panels 26 are then placed in a operative or closing position such as to compress the resilient actuation means 31. Pin 33 is then inserted through bosses 22 and aperture 29 to secure panels 26 in their operative or closing position. Battery 24 may be stored for considerable periods of time using only the fluid seal afforded by panels 26. Of course, if desired, batteries 24 may be stored immersed in a container of the inert fluid such that seepages and leakage therefrom become immaterial.

When it is desired to employ battery 24 in an oceanographic instrument, it is connected in circuit therewith and placed in the oceanographic environment. For example, in the environment illustrated in FIG. 1, battery 24' in hydrophone housing 12 may be subjected to the ambient water pressure of several hundred meters. As battery 24 descends to these depths, the hydrostatic pressure acting on the lateral walls 25 and the top and bottom panels thereof attempt to compress the walls of the battery. However, inasmuch as the battery is fluid filled this compressional force is resisted by the incompressibility of the liquid filling. If, however, a slight concavity of the walls is experienced their flexible nature prevent mechanical failure or disorientation of the electrodes contained therein and pressure forced seepage through apertures 30 beneath panels 26 may permit a minute amount of inner fluid to escape to equalize the pressures.

At the time for actuation pin 35 is either withdrawn or dissolves and resilient members 31 acting against connecting linkage 28 withdraw panels 26 in a path determined by guides 34. When the panels are thus withdrawn are moved to their inoperative position, the difference in specific gravity of the inert fluid and the ambient seawater cause displacement via apertures 30. In a very short time, seawater battery 24 is completely filled and electrical activation begins.

The foregoing description taken together with the appended claims constitute a disclosure such as to enable a person skilled in the marine engineering and electronic arts and having the benefit of the teachings contained therein to make and use the invention. Further, the structure herein described meets the objects of invention, and generally constitutes a meritorious advance in the art unobvious to such a person not having the benefit of these teachings.

Obviously, many modifications and variation of the present invention are possible in the light of the above teachings, and, it is therefore understood that within the scope of the disclosed inventive concept, the invention may be practiced otherwise than specifically described.

What is claimed is:

1. A seawater activated battery for an oceanographic instrumentation package comprising:
   A plurality of lateral walls enclosing a space for positioning seawater activated electrodes;
   top and bottom panels spaced from one another and effectively sealing the top and bottom of said lateral walls such as to cooperate therewith to enclose a predetermined volume;
   aperture means in said top and bottom panels to permit fluid passage therethrough;
   closure means configured and positioned to sealably close said apertures to prevent fluid passage therethrough;
   retention means effectively connected to said closure means for holding said closure means in the sealably closed position relative to said aperture to prevent movement thereof;
   and actuation means to selectively overcome the action of said retention means for moving said closure means to a position permitting fluid flow through said apertures.

2. A seawater activated battery according to claim 1 in which said lateral walls and top and bottom panels are made of a flexible material.

3. A seawater activated battery according to claim 1 in which said closure means comprise top and bottom flat panel members which in one position cooperate with and close said apertures while maintaining planar contact with the top and bottom panels.

4. A seawater activated battery according to claim 3 further comprising guide means mounted on said top and bottom panels to cooperate with the aforesaid closure means for providing retention and movement direction therefor.

5. A seawater activated battery according to claim 4 further including linkage means effectively connecting the top and bottom ones of said closure means for unitary movement.

6. A seawater activated battery according to claim 5 in which said retention means includes:
   an aperture carried on said linkage means for receiving a retention pin therein;
   a plurality of bosses having transverse apertures therein attached to one lateral wall to project outwardly therefrom in alignment with the linkage means aperature for cooperatively receiving the retention pin; and
   a retention pin extending through the aperture in each of said bosses and the aperture carried on said linkage means for securing said linkage and thereby said top and bottom enclosure panels in the cooperative position closing the aforesaid apertures.

7. A seawater activated battery according to claim 6 in which the retention pin is made of a water soluble material.

8. A seawater activated battery according to claim 6 in which said retention pin is configured to be axially displaced from said bosses and aperture.

9. A seawater activated battery according to claim 6 in which the aforesaid actuation means comprise resilient members attached to a lateral wall so as to engage the aforesaid linkage means and resiliently urge it into a retracted position.

10. A seawater activated battery according to claim 9 in which the resilient members are coil springs.

* * * * *